Jan. 5, 1932.  E. S. JOHNSTON  1,839,762
PIE PLATE WASHING MACHINE
Filed April 3, 1929
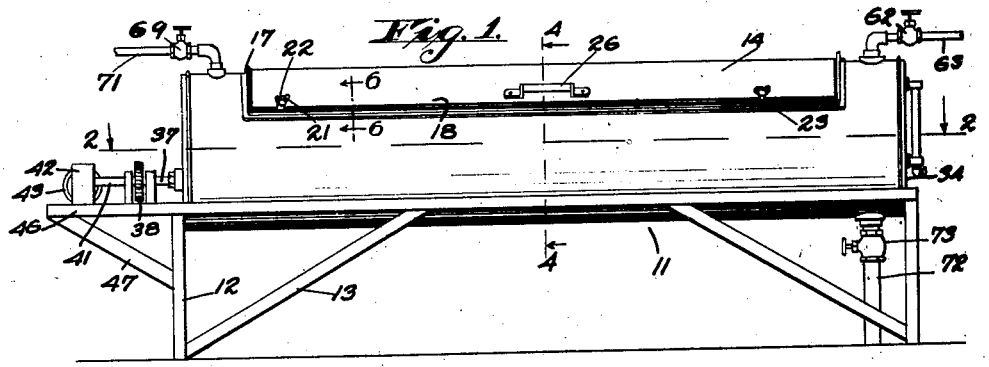
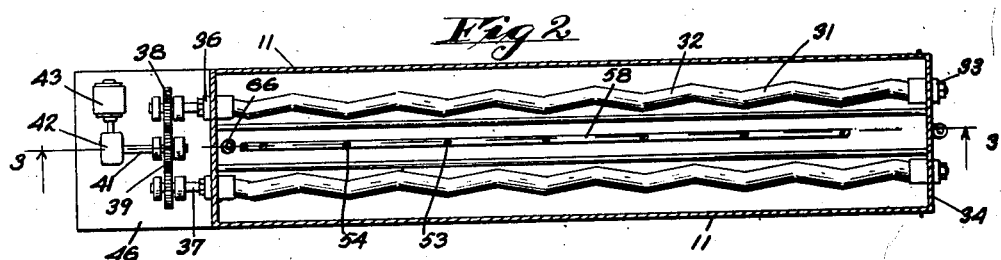
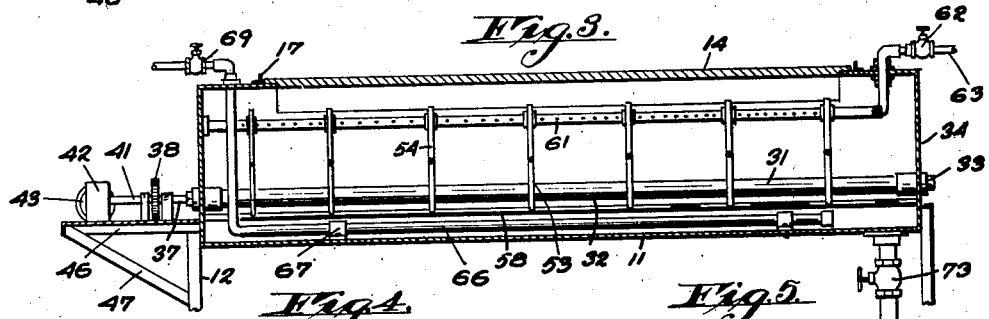
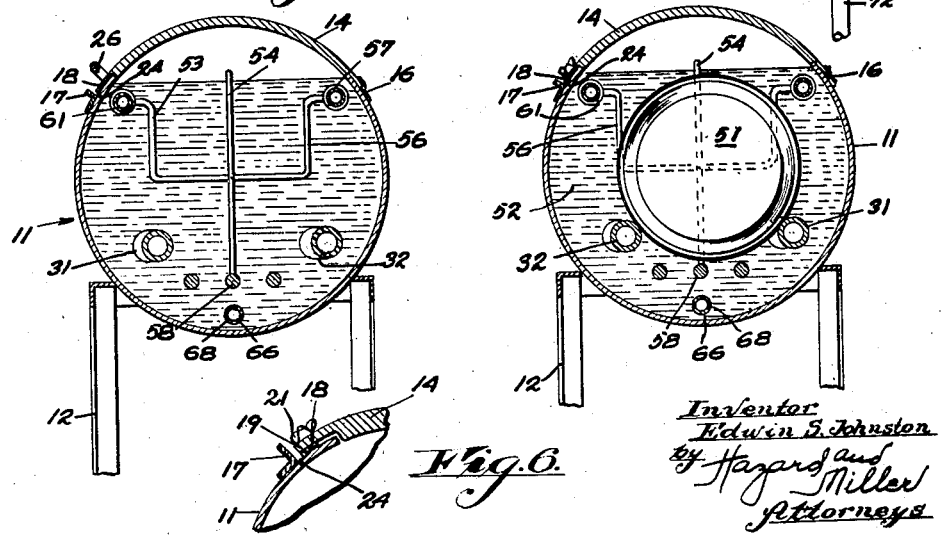
Inventor
Edwin S. Johnston
by Hazard and Miller
Attorneys Patented Jan. 5, 1932

1,839,762

UNITED STATES PATENT OFFICE

EDWIN S. JOHNSTON, OF EAGLE ROCK, CALIFORNIA

PIE PLATE WASHING MACHINE

Application filed April 3, 1929. Serial No. 352,197.

This invention relates to mechanical washers, and more particularly to a machine for washing plates.

An object of the invention is the provision of a machine capable of efficiently and expeditiously washing a plurality of plates.

A more detailed object is the provision of a machine of the general class described, which is particularly adaptable for use in thoroughly cleansing such plates as those commonly employed for the retention of pies during the baking thereof. It should be called to attention that a peculiar problem is presented in cleansing pie plates, in that during the baking process, fruit juices are apt to leak through the crust of the pies, to collect and solidify upon the interior surface of the pie plates, or be reduced to a sticky mass, depending upon the length of time the plate remains in the baking oven after such leakage has occurred, and also depending upon the nature of the syrup itself, which varies according to the particular fruit employed, as well as according to the degree of concentration of the syrup. Heretofore, it has been customary practice to wash such plates by hand, because of the difficulty encountered in removing this collected syrup; and the process of hand washing, in that it is a tedious, time-requiring task, presents an item of considerable expense in baking establishments where a considerable number of pies are prepared. The characteristics peculiar to my improved plate washing machine, lend thereto an efficiency of operation which overcomes these difficulties, and result in the provision of an apparatus capable of thoroughly cleansing a large number of plates within an exceedingly short time, compared to the time required by the old hand process of washing.

A further object is the provision of a plate washing machine adapted to handle tin pie plates and cleanse them efficiently, without any danger whatsoever, of deforming the plates.

A still further object is the provision of a plate washing machine of the general class described, which operates very silently, and which is capable of being built of any desired size within limits, to receive as great a number of plates at one time, as may be desired.

A still further object is the provision of a plate washing machine particularly adapted for washing a large number of tin pie plates at one time, in which the cleansing of the pie plates is effected by a scrubbing action produced by the friction of one plate against that upon each side thereof. In other words, the machine of my invention does not require the provision of scrubbing brushes or other members, inasmuch as each plate serves as a scrubbing member for the plates thereadjacent.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a side elevation of a plate washing machine incorporating the principles of my invention.

Fig. 2 is a horizontal, medial sectional view taken upon the line 2—2 of Fig. 1, with the direction of view as indicated.

Fig. 3 is a vertical, medial, longitudinal sectional view taken upon the line 3—3 of Fig. 2, with the direction of view as indicated. Portions of the supporting structure are broken away to reduce the size of the figure.

Fig. 4 is a vertical, transverse sectional view taken upon the line 4—4 of Fig. 1, with the direction of view as indicated. Portions of the supporting structure are broken away to reduce the length of the figure.

Fig. 5 is a view similar to Fig. 4, showing the machine in operation.

Fig. 6 is an enlarged, detail sectional view taken upon the line 6—6 of Fig. 1, with the direction of view as indicated.

In terms of broad inclusion, the plate washing machine of the present invention, comprises an elongated tank having a pair of spaced, sinuous shafts rotatably mounted adjacent the bottom thereof and spaced in axial parallelism to support on edge, a relatively large number of pie plates. As these shafts are rotated, the pie plates which are supported thereupon, are also rotated; and the sinuosity of these shafts, imparts to the plates, a rocking or churning motion in which each plate has a continuous sliding motion in respect to the plates upon either side thereof, with the result that each plate serves as a scrubber for the plates thereadjacent, efficiently removing all traces of collected syrup, and crust therefrom.

Specifically describing the invention in its most practical embodiment of which I am at present aware, the plate washing machine comprises an elongated and preferably cylindrical tank 11, suitably supported by means of a plurality of legs 12 and braces 13 which may conveniently be formed of angle irons of the proper dimensions. A lid 14, preferably arcuate in cross sectional configuration, is hinged along preferably its after edge, as at 16, to optionally open or close an opening which extends preferably throughout the major portion of the top of the tank 11. Preferably this opening is surrounded by a bead 17 which may conveniently be formed of an angle iron made fast to the tank 11, this bead 17 defining a recess within which the lid 14 is adapted to seat when closed. The lip 18 of the lid 14, which engages the tank 11 throughout the entire periphery of the lid, is preferably provided with a gasket 19, to eliminate as far as is practical, the leakage of water to the exterior of the tank 11, through the joint between the lid and the tank. The efficiency of the gasket is enhanced by the provision of a plurality of fastening means such as wing nuts 21 threaded upon bolts 22 secured to the tank and extending through slots 23 in that edge of the lid 14, remote from its hinges 16. Furthermore, a plurality of drains 24, may penetrate the wall of the tank just above the bead 17, permitting any water that does leak past the gasket 19, to re-enter the tank. Opening and closing the lid 14, is facilitated by the presence of a handle 26.

A pair of spaced, axially parallel shafts 31, are journalled to extend longitudinally of the tank 11, preferably adjacent the bottom thereof. As is most clearly shown upon Fig. 2, both shafts 31 are sinuous in configuration, each being composed of a plurality of angularly disposed sections 32. Journals 33 are provided for the ends of the shafts 31 in each of the end walls 34 of the tank 11, the journals 33 at one end of the tank, being provided with stuffing-boxes 36, so that extensions 37 of the shafts 31, may reach to the exterior of the tank without the danger of leakage through these journals. Each of these extensions is provided with a gear 38; and both gears 38 are enmeshed with a common gear 39 which is carried by a shaft 41 leading from a gear reduction box 42. A motor 43 is coupled to the gear reduction box, so as to drive the shaft 41 at reduced speed, the preferable speed of rotation of the shafts 31, being in the neighborhood of 60 revolutions per minute. The motor, gear reduction box, and gears 38 and 39, are suitably supported upon a platform 46 extending from one end of the tank 11, and braced by arms 47.

The spacing between the sinuous shafts 31, is such that a plurality of pie plates 51 (see Fig. 5) are supported upon edge, so that as the shafts rotate, the plates 51 also have rotational movement imparted thereto. Furthermore, the sinuosity of the shafts 31 upon which these plates 51 are supported, will impart to the plates 51, a churning or rocking movement during their rotation; and inasmuch as the point of contact of each plate is spaced from the axis of rotation of each shaft, a distance which is different from the corresponding point of contact of the adjacent plate, owing to the angularity of the sections 32 of the shafts 31, each of the plates 51 will have this rocking or churning movement, not only in respect to the tank 11, but also in respect to both adjacent plates. As a result, each plate rubs upon those thereadjacent, producing a scouring action in the presence of water 52 in which the plates are partially or completely submerged. The plates are retained in upright position upon edge, upon the shafts 31, by a plurality of separators 53 which are formed conveniently of rods 54 and 56 rigidly mounted within the tank 11 at spaced intervals throughout the length thereof. Water supply pipes 57, extending longitudinally of the tank 11, provide a convenient support for the upper ends of the separators 53, whereas one of preferably a plurality of stay rods 58 adjacent the bottom of the tank, serves to rigidly mount the lower portions of the separators. The supply pipes 57 are provided with a plurality of orifices 61 directed preferably toward the shafts 31, and are connected through a control valve 62, to a conduit 63 leading to a suitable supply of preferably hot water under pressure. In addition, a steam supply pipe 66 extends longitudinally of the tank 11, adjacent the bottom thereof, being secured in any convenient manner such as by a plurality of brackets 67. This steam pipe 66 also has a plurality of orifices 68, and is connected through a control valve 69, to a conduit 71 leading to a suitable supply of steam. A drain 72 having a control valve 73 therein, leads from preferably the lowest portion of the bottom of the tank 11.

The plate washing machine of the present invention, operates in a manner which is believed to be readily understood from the above description of its constituent parts. By opening the lid 14, the plates to be washed may conveniently be set into the tank 11 and positioned upright upon edge upon both shafts 31, the separators 53 serving to divide the plurality of plates into groups and to hold them erect. It might be observed that inasmuch as the plates tend to nest with each other, a large number of plates may be thus positioned in a relatively small machine. For example, the plate washing machine illustrated upon the drawings, and the tank 11 of which is substantially 10 ft. in length, is capable of accommodating 500 plates without overcrowding at a single washing.

After the plates have been thus positioned within the washer, water preferably heated to a degree only slightly lower than the boiling temperature, is supplied to the tank by opening the valve 62. This water will be sprayed forcibly upon the plates, after which it will collect in the bottom of the tank. The water should be thus supplied until the tank is approximately two-thirds full, practically completely immersing the plates 51. If desired, a suitable detergent may be supplied to assist in thoroughly cleansing the plates. The motor 43 should be energized to impart rotary movement to the shafts 31, with the result that rotational and rocking movement will be imparted to the plates as above described. Now, by opening the steam supply valve 69, steam under pressure, may be injected into the water 52 below the pie plates. If the steam is supplied in sufficient quantity, violent agitation is imparted to the water surrounding the plates 51, causing this scalding hot water to swirl and surge back and forth and between the plates, to add materially to the efficiency of the washing operation. This agitation should be continued long enough to effect their thorough cleansing. In actual practice, I have found that fifteen or twenty minutes is ample time. Then, the washing water should be withdrawn by opening the drain valve 73, and the plates thoroughly rinsed by again spraying or immersing them in clean hot water which may be provided by again opening the supply valve 62.

It should be observed that this process of cleaning pie plates, is much more efficient and sanitary than the old laborious hand process, in that the plates may be washed in scalding hot water, which is precluded in the hand process. Furthermore, the violent agitation of the water, results in completely removing all traces of syrups and pie crusts which tend to collect under the beads or curled edges of the pie tins. Furthermore, the necessity of drying the plates, is obviated, inasmuch as the water in which the plates are rinsed, is at such a high temperature that any water remaining upon the plates after they have been removed from the tank 11, will rapidly evaporate.

One of the salient features of the washing machine incorporating the features of my invention, is that it operates practically in silence, because the plates are not tumbled about violently, but merely rolled, this rolling action being sufficiently gentle as to preclude all possibility of the plates clashing against each other. It is obvious that another result is that the plates are not subjected to denting or other disfigurement from violent handling, which, in itself, presents a radical improvement over any method of washing tin pie plates, of which I am aware.

It is to be understood that the details of the invention as herein disclosed, are subject to alteration within the spirit or scope of the appended claims.

I claim:

1. A plate washing machine comprising a tank adapted to contain a liquid, a pair of sinuous shafts journalled in said tank in axial parallelism and spaced to support on edge a plurality of plates, and means for rotating said shafts.

2. A plate washing machine comprising a tank adapted to contain a liquid, a pair of sinuous shafts journalled in said tank in axial parallelism and spaced to support on edge a plurality of plates, means for rotating said shafts, and spaced separators adapted to divide said plurality of plates into groups and hold the plates upright upon the shafts.

In testimony whereof I have signed my name to this specification.

EDWIN S. JOHNSTON.